May 24, 1932.          B. J. CHROMY          1,859,551
SOUND REPRODUCING APPARATUS
Filed Oct. 15, 1928          2 Sheets-Sheet 1
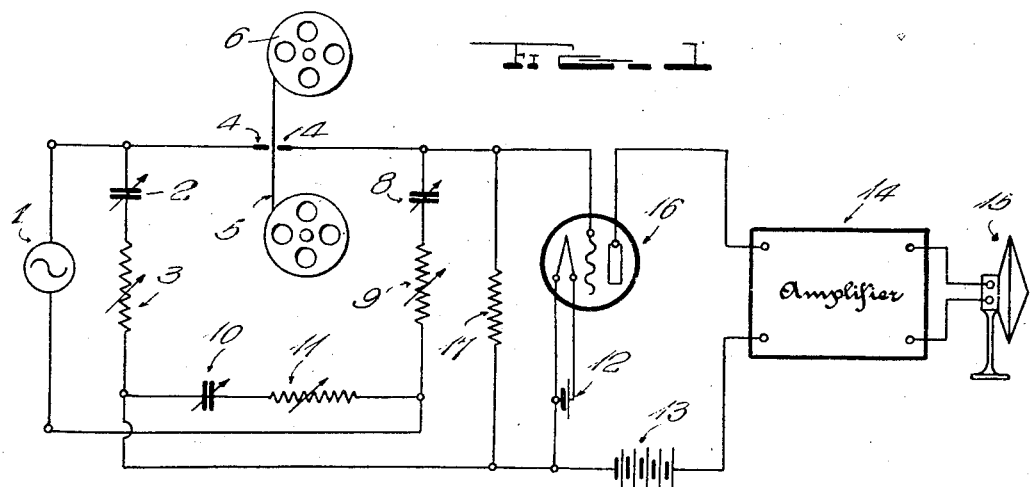
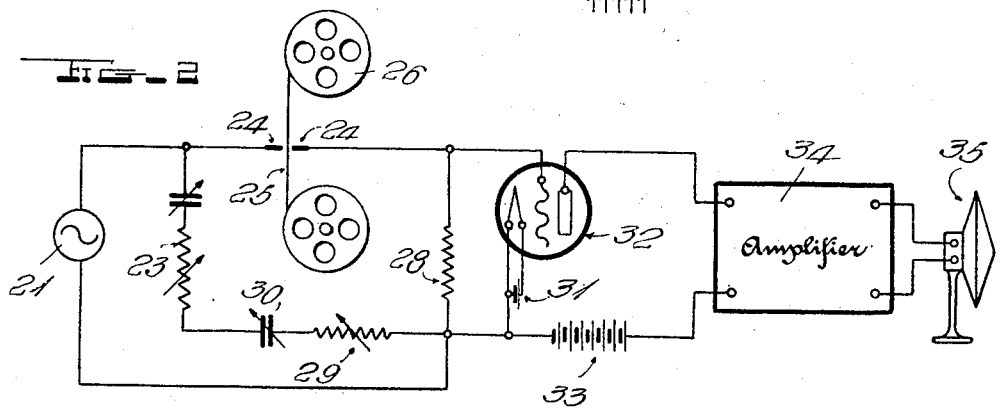
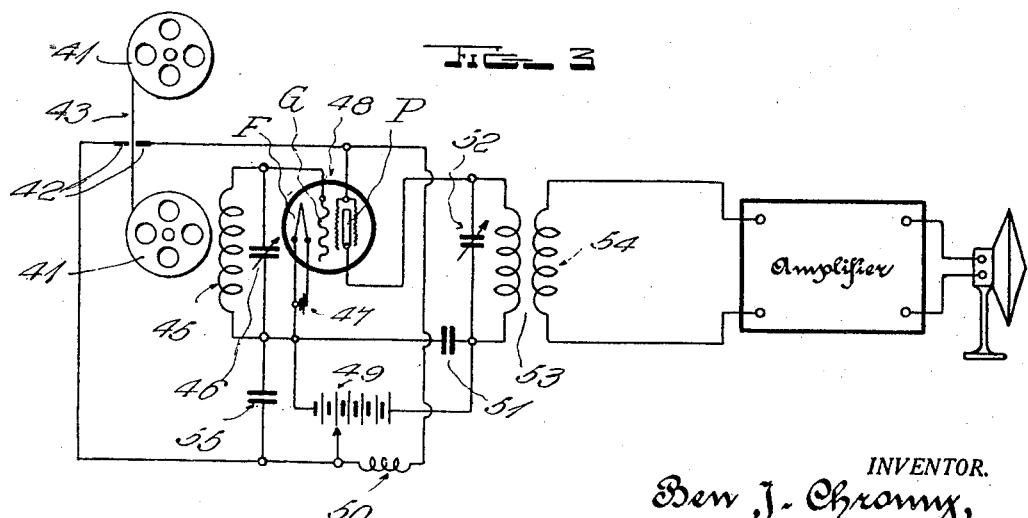
INVENTOR.
Ben J. Chromy,
BY John C. Brady
ATTORNEY May 24, 1932. B. J. CHROMY 1,859,551
SOUND REPRODUCING APPARATUS
Filed Oct. 15, 1928   2 Sheets-Sheet 2
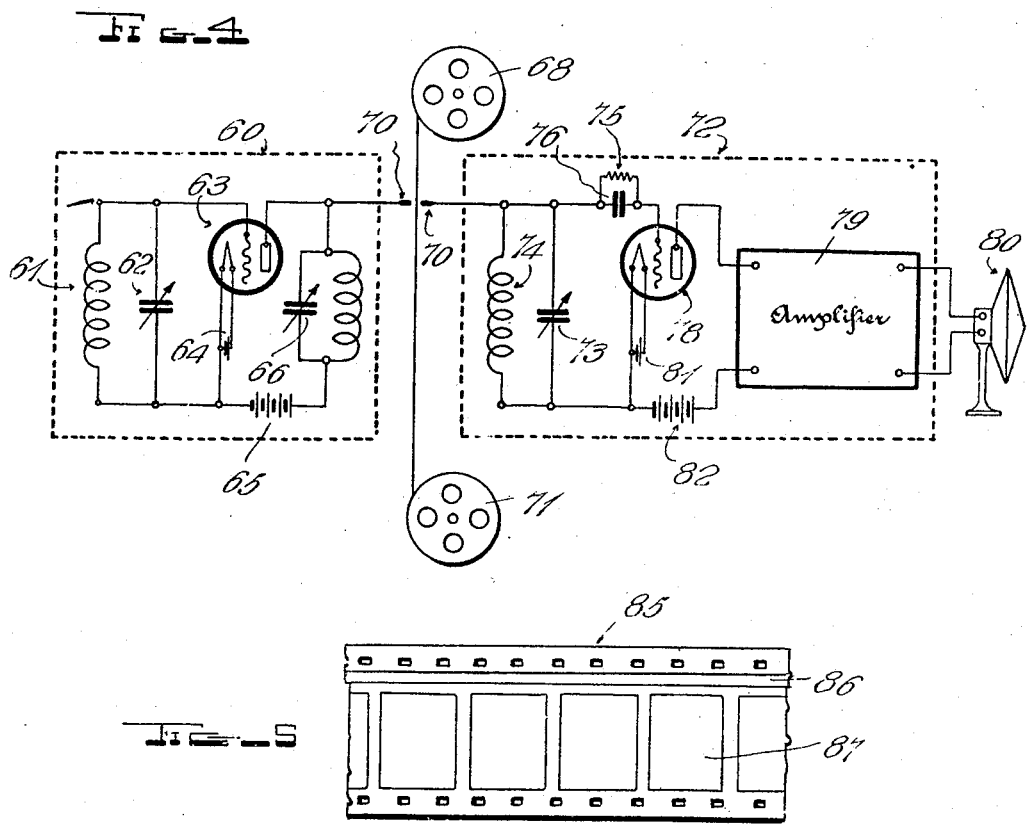
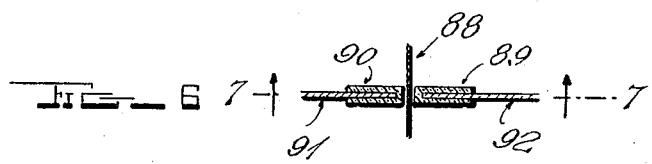
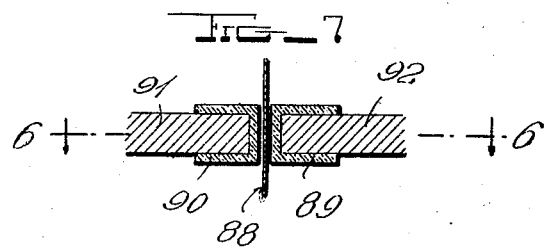
INVENTOR.
Ben J. Chromy,
BY John C. Brady
ATTORNEY Patented May 24, 1932

1,859,551

UNITED STATES PATENT OFFICE

BEN J. CHROMY, OF HOPKINS, MINNESOTA, ASSIGNOR TO WIRED RADIO, INC., OF NEW YORK, N. Y., A CORPORATION OF DELAWARE

SOUND REPRODUCING APPARATUS

Application filed October 15, 1928. Serial No. 312,627.

This invention relates to sound reproduction in general and more specifically to the reproduction of sound recorded upon a film strip.

An object of this invention is to provide means whereby the sound record from a film strip may be reproduced without the use of light rays.

Another object of this invention is to provide means whereby the sound record from a film strip may be reproduced without employing photo-electric devices.

A further object of this invention is to provide means whereby the sound record from a film strip may be reproduced by causing the sound record bearing portion of the film to vary the potential applied to an electrode of a thermionic vacuum tube.

Other and further objects and features of this invention will be apparent to those skilled in the art of sound reproduction from the following specification and the appended claims.

In this invention I provide novel means for reproducing sound records. The sound record bearing film strip is passed between two electrodes one of which is connected to an electrode of a vacuum tube for varying the potential of that electrode with respect to the other electrodes of the tube in accordance with the sound record of the film strip. The electrodes between which the film strip passes may be connected into several circuit arrangements the preferred forms of which are illustrated in the accompanying drawings.

In the drawings Fig. 1 shows the electrodes between which the sound record passes connected into a bridge circuit arrangement. Fig. 2 shows a modification of this invention. Fig. 3 shows another modification of this invention in which a four electrode thermionic vacuum tube is employed in the reproduction of the sound record. Fig. 4 shows a further modification of this invention in which the sound record is employed to vary the magnitude of the radio frequency voltage applied to the input circuit of a thermionic vacuum tube. Fig. 5 illustrates a film strip bearing a sound record and a picture record. Fig. 6 is a sectional view of the electrodes taken along the line 6—6 of Fig. 7. Fig. 7 is a sectional view of the electrodes taken along the line 7—7 of Fig. 6.

Referring to Fig. 1 of the drawings in detail, 16 designates a vacuum tube detector having filament, grid and plate electrodes F, G and P respectively. A grid leak 17 is connected between the filament and grid electrodes. A bridge circuit including variable resistances and variable capacities is connected to the filament and grid electrodes of the vacuum tube 16. A source of high frequency current 1 is connected across the bridge circuit. Variable capacities 2, 8 and 10 and variable resistances 3, 9 and 11 are connected in series and make up three legs of the bridge circuit. The capacity 2 and the resistance 3 form one leg of the bridge circuit; the capacity 8 and the resistance 9 form a second leg of the bridge circuit; and the capacity 10 and the resistance 11 form a third leg of the bridge circuit. Into the fourth leg of the bridge circuit are connected the electrodes 4, 4. These electrodes 4, 4 are disposed upon the opposite sides of the sound record bearing portion of the film 5.

A source of electric current 12 is connected to the filament of the audion 16. A source of anode potential 13 for the audion 16 is connected to the anode electrode of the audion 16 through the input circuit of the audio frequency amplifier 14. A sound reproducing device 15 is connected to the output circuit of the amplifier 14.

Normally when the bridge circuit 2, 3, 8, 9, 10, 11, 4, 5, 4 is balanced the potential difference existing between the filament and the grid will be substantially zero. When the balance in the bridge circuit is disturbed, as for example, by varying either the resistance or the capacity of any of the legs of the bridge circuit, the source of high frequency current sets up a potential difference between the grid and filament electrodes of the tube 16. When the film strip 5 bearing the sound record is moved between the electrodes 4, 4 the balance of the bridge is disturbed in accordance with the sound record passing between the electrodes 4, 4 and modulated high frequency potential is impressed across the filament and grid electrodes of the tube 16. This modulated high frequency potential is detected and modulated plate current is caused to flow in the plate circuit of the tube 16. This modulated plate current varies in accordance with the sound frequencies of the sound recorded upon the film strip 5. The modulated high frequency potential may be amplified in any conventional way before it is impressed upon the input circuit of the detector tube 16.

In Fig. 2 is illustrated a modified form of this invention. In this modification the grid-filament circuit of the vacuum tube or audion 32 is connected in series with the electrodes 24 adjacent to the sound record bearing strip to the source of electrical oscillations 21. The capacity and resistance between the electrodes 24, 24 are varied by the film strip 25. The variable capacity 22 and variable resistance 23 and the variable capacity 30 and variable resistance 29 are employed to control the amplitude of the electrical oscillations derived from the source 21. The variable resistance units 23 and 29 are shown connected in series with the variable capacity units 22 and 30 respectively, however, these variable resistors may be connected in parallel with the variable capacity units.

A source of high frequency 21 is connected across the bridge circuit. One terminal of the source 21 is connected to a point between one of the electrodes 24 and the variable capacity 22; the other terminal is connected to a point between the grid leak 28 and the variable resistance 29.

A source of electric current 31 is connected to the filament of the audion 32. The output circuit of the amplifier 34 is connected to the output of the tube 32. A source of plate current 33 is connected to the plate electrode of the tube 32 through the input circuit of the amplifier 34. A sound reproducing device 35 is connected to the output circuit of the amplifier 34. Amplified electrical energy modulated in accordance with the sound record carried by the film 25 is fed to the sound reproducing device 35.

When the film 25 is wound from the reel 26 to the reel 27 it is caused to move between the electrodes 24, 24. If the bridge circuit 22, 23, 24, 24, G, F, 29, 30 is balanced when clear film of a certain dimension is disposed between the electrodes 24, 24 then as the film 25 bearing a sound record is moved between the electrodes 24, 24 the bridge circuit becomes unbalanced and a difference of potential is impressed across the grid and filament of the audion 32. This potential difference varies in accordance with the sound record on the film strip. A current modulated in accordance with the sound record is caused to flow in the anode circuit of the audion 32 and in the input circuit of the amplifier 34. The sound reproducing device 35 is actuated by the output of the amplifier and transforms the electrical energy into sound waves.

Another modification of this invention is shown in Fig. 3. In this modification a screen grid thermionic vacuum tube 48 having filament or cathode electrode F, grid electrode G, plate electrode P, and shielding grid electrode is employed. A tuned circuit composed of the inductance 45 and the capacity 46 is connected to the grid and filament electrodes of the vacuum tube. A similar tuned circuit employing a capacity 52 and an inductance 53 is connected to the anode and filament electrodes of the vacuum tube 48. A source of anode current supply is connected between the tuned circuit 52, 53 and the filament electrode F. A high frequency by-pass condenser 51 is connected across the source of anode current supply 49. A source of electrical energy 47 is connected to the filament F. The shielding grid electrode is connected to the source of supply 49 through the choke coil 50. The shielding grid electrode is also connected to one of the electrodes 42. A radio frequency by-pass condenser 55 is connected between the other electrode 42 and the filament F. The sound record bearing film 43 is moved between the electrodes 42, 42 as it is wound from reel 41 to the reel 44.

Sustained high frequency oscillations are generated by the interaction of the input and output circuits of the vacuum tube 48 when the tuned circiuts 45, 46 and 52, 53 are in resonance to approximately the same frequency. The small radio frequency current will oscillate through the shielding grid circuit comprising the electrodes 42, 42. The film disposed between these electrodes acts as the dielectric.

The character of the sound waves recorded upon the film strip 43 varies the dielectric constant. The radio frequency oscillations in the shielding grid circuit are, consequently modulated according to the sound record on the film 43. Correspondingly modulated high frequency potential is induced across the inductance 54 which is connected either to a high frequency amplifier or to a detector tube.

The film 43 may be the ordinary celluloid film sensitized in the ordinary way and the sound record fixed upon it through the action of pulsating light rays and the usual chemical processes or it may be a strip of waxy material upon which indentations varying in depth or width in accordance with sound waves are registered. Again the sound record may be a strip of material bearing perforations which vary in size and shape in accordance with sound waves. Any type of film in which the dielectric constant is varied in accordance with sound waves or impulses may be used in the sound reproducing devices of this invention.

Fig. 4 shows a further modification of this invention. In this modification the output circuit of a high frequency oscillation generating vacuum tube 63 is coupled through the electrodes 70, 70, between which a sound record bearing strip 69 is moved, to the input circuit of a vacuum tube 78. The output circuit of the vacuum tube 78 is coupled to an amplifier 79 which is connected to a sound reproducing device 80.

A tuned circuit comprising an inductance 61 and a capacity 62 is connected to the grip and filament electrodes of the vacuum tube 63. The filament of the audion 63 is excited by energy received from the source 64. The anode of the audion 63 is connected to the current source of supply 65. A tuned circuit including an inductance 67 and a capacity 66 is connected between the plate and filament of the audion 63.

The frequency of the oscillations generated by the vacuum tube 63 is determined by the tuned circuits 61, 62 and 66, 67. This frequency should be rather high, preferably around 10,000 kilocycles to 20,000 kilocycles. At these high frequencies the transfer of high frequency energy through the capacity formed by the electrodes 70, 70 is sufficient to excite the input circuit of the audion 78 when a small vacuum tube having an output of five watts of high frequency energy is employed as an oscillation generator 63.

A tuned circuit 73, 74 is connected to the grid and filament electrodes of the audion 78. This circuit is tuned to resonance at the frequency of the oscillations generated by the vacuum tube 63. A grid leak 75 of high resistance and a small capacity 76 are connected to the grid of the tube 78. A source of anode current supply 82 is connected into the output circuit of the tube 78.

The output circuit of the tube 78 is connected to the amplifier 79 which is connected to the sound reproducing device 80. The sound record bearing strip 69 is wound upon either one of the reels 68 or 71. An electromagnetic and electrostatic shield 60 is provided for the oscillation generator 63 and its associated tuned circuits 61, 62 and 66, 67. A similar shield 72 is provided for the audion 78 and its associated amplifying circuits.

When the sound record bearing film 69 is moved through the space between the electrodes 70, 70 the capacity and the radio frequency resistance between these electrodes is varied in accordance with the sound record. The magnitude of the radio frequency current transferred to the input circuit 73, 74 of the vacuum tube 78 is, therefore varied in accordance with the sound record. Electrical impulses, the wave form of which is governed by the sound record being reproduced from the film or strip 69 are rectified and amplified by the tube 78 and further amplified by the amplifier 79. A radio frequency amplifier of any suitable type may be employed to amplify the electrical impulses before they are fed to the circuits of the detector tube 78.

In Fig. 5 is shown a film strip 85 bearing a sound record in the space 86 and pictures in the space 87. The space corresponding to the sound recording bearing space 86 is the part that is passed between the electrodes 70, 70 of Fig. 4, 42, 42 of Fig. 3, 24, 24 of Fig. 2 and 4, 4 of Fig. 1.

Figs. 6 and 7 illustrate the preferred form of the construction of the electrodes. In Figs. 6 and 7—88 designates the sound record bearing flexible strip; 89 and 90 designate an envelope of insulating material, such as quartz, glass or phenol condensation products, surrounding the ribbon shaped metallic conductors 91 and 92.

Having thus described the preferred forms of my invention what I claim and desire to secure by Letters Patent of the United States of America is:—

1. In a device of the class described the combination of, a vacuum tube having input and output circuits, a sound record bearing film strip, electrodes disposed adjacent to the sound record of said film strip, said electrodes and said film strip comprising one leg of a bridge circuit arrangement, adjustable resistance elements in each leg of said bridge circuit arrangement means for generating high frequency oscillations, connections between said high frequency generating means and one of said electrodes, connections between the other of said electrodes and the input circuit of said vacuum tube.

2. In sound reproducing devices of the class described the combination of, a vacuum tube having input and output circuits, a sound record bearing strip, a source of high frequency oscillations a plurality of electrodes disposed adjacent to said sound record bearing strip, said electrodes and said film strip disposed adjacent to said electrodes comprising one leg of a bridge circuit arrangement, adjustable resistance elements disposed in the other legs of said bridge circuit, one of said electrodes being connected to the input circuit of said vacuum tube, another of said electrodes being connected to said source of high frequency oscillations, means for moving said strip between said electrodes for varying the transfer of high frequency energy from said last named electrode to said electrode connected to the input circuit of said vacuum tube in accordance with the sound record upon said strip.

3. In sound reproducing devices the combination comprising, a source of high frequency oscillations, a vacuum tube having input and output circuits, a pair of electrodes, one of said electrodes being connected to the input circuit of said vacuum tube and the other electrode being connected to said source of high frequency oscillations, said electrodes being connected into one arm of a Wheatstone bridge circuit said Wheatstone bridge circuit including adjustable impedance elements in each arm thereof, a dielectric having a dielectric constant greater than one disposed between said electrodes said dielectric having a sound record registered thereon, and means for moving said dielectric, the energy transferred from said source to said vacuum tube input circuit being modulated in accordance with said sound record.

4. In a sound reproducing system, a control circuit comprising an electron tube having input and output circuits, an amplifier system connected with said output circuit, a sound reproducer connected with said amplifier system, a Wheatstone bridge circuit including variable resistance and capacity elements in three arms thereof and a variable capacity element in the remaining arm thereof, a source of high frequency current connected across two of the arms including said variable capacity and resistance elements, and a connection between the point of juncture of said last mentioned arms and said arm including said variable capacity, said variable capacity comprising a sound film record operative between electrodes disposed in the arm occupied by said variable condenser, said sound film record being movable to vary the capacity of said arm and correspondingly control the effect of said high frequency current source upon the input circuit of said electron tube for controlling the operation of said amplifier and correspondingly controlling the reproduction of sound.

In testimony whereof I affix my signature.

BEN J. CHROMY.